United States Patent
Leroy

(10) Patent No.: US 12,327,463 B2
(45) Date of Patent: Jun. 10, 2025

(54) SECURITY SYSTEM

(71) Applicant: Nami Ai Pte Ltd., Singapore (SG)

(72) Inventor: Jérôme Leroy, Singapore (SG)

(73) Assignee: Nami Ai Pte Ltd., Singapore (SG)

( * ) Notice: Subject to any disclaimer, the term of this patent is extended or adjusted under 35 U.S.C. 154(b) by 138 days.

(21) Appl. No.: 17/940,247

(22) Filed: Sep. 8, 2022

(65) Prior Publication Data
US 2023/0077186 A1 Mar. 9, 2023

(30) Foreign Application Priority Data
Sep. 8, 2021 (SG) .......................... 10202109880U

(51) Int. Cl.
H04W 12/06 (2021.01)
G08B 13/181 (2006.01)
G08B 13/196 (2006.01)
G08B 13/24 (2006.01)

(52) U.S. Cl.
CPC ..... *G08B 13/181* (2013.01); *G08B 13/19684* (2013.01); *G08B 13/2491* (2013.01); *H04W 12/06* (2013.01)

(58) Field of Classification Search
CPC .............. G08B 13/181; G08B 13/2491; G08B 13/19684; H04W 12/06
See application file for complete search history.

(56) References Cited

U.S. PATENT DOCUMENTS 10,600,314 B1  3/2020  Manku et al.
11,397,258 B2 * 7/2022  Zeng ...................... G01S 7/415
2006/0022816 A1 * 2/2006  Yukawa ............... G08B 25/006
                                                            340/5.83
2007/0008099 A1 * 1/2007  Kimmel ................. G08B 25/14
                                                             340/506
2015/0339407 A1 * 11/2015 Gallo ....................... G01D 9/32
                                                              707/736

(Continued)

FOREIGN PATENT DOCUMENTS

EP        3695783 A1 *  8/2020 ........... A61B 5/0022

OTHER PUBLICATIONS

Search Report from European Patent Application No. 22194703.9, dated Jan. 23, 2023.

(Continued)

*Primary Examiner* — John A Tweel, Jr.
(74) *Attorney, Agent, or Firm* — Dergosits & Noah LLP; Todd A. Noah

(57) ABSTRACT

A monitoring system for monitoring a plurality of places at separate geographical locations, the monitoring system comprising a computer device having a user interface configured to receive an identifier of a monitoring user, a processor configured to process multiple streams of sensed data, each stream of sensed data comprising sensed data for a respective one of the plurality of places and indicative of one or more sensed event in the respective place, to generate display data for display at the user interface of the computer device, wherein the displayed data comprises a respective visual representation of a set of data for each of the plurality of places and the processor configured to simultaneously render at the user interface at least two of the sets of data associated respectively with at least two of the plurality of places associated with the monitoring user.

17 Claims, 11 Drawing Sheets

(56) References Cited

U.S. PATENT DOCUMENTS

| | | | |
|---|---|---|---|
| 2017/0225336 A1* | 8/2017 | Deyle | B25J 13/006 |
| 2018/0019889 A1 | 1/2018 | Burns et al. | |
| 2020/0066129 A1* | 2/2020 | Galvez | H04W 4/029 |
| 2021/0097835 A1* | 4/2021 | Stimek | G08B 25/10 |
| 2021/0219100 A1* | 7/2021 | Shayne | H04W 4/029 |
| 2022/0122190 A1* | 4/2022 | Mohammed | H04L 51/52 |

OTHER PUBLICATIONS

Official Communication pursuant to article 94(3) EPC from European Patent Application No. 22194703.9, dated Jul. 18, 2024.

* cited by examiner

| User ID | Name | User Type | Hobby Icon |
|---|---|---|---|
| U0001 | Peter | 1 | Bulb |
| U0002 | Claire | 2 | Plant |
| U0003 | Julie | 2 | Camera |
| . . . | . . . | . . . | . . . |

SECURITY SYSTEM

TECHNICAL FIELD

The present invention relates to a security system, and particularly but not exclusively to a system and method for monitoring a plurality of places.

BACKGROUND

Home security is an extremely important need, both for individual house residence and business owners. They share a common interest to keep their respective places safe. Presently the security industry utilises many different products, including alarm systems and/or security cameras. Alarm systems are wired or rely on proprietary RF sensors at entry points such as doors and windows, and usually require professional installers.

Security cameras are not easy to install, and real-time streaming on multiple cameras is complex and expensive to manage. Moreover, the overwhelming wealth of data makes it difficult to accurately spot an intruder. There are also privacy issues associated with camera-based security systems.

Wi-Fi, one of the most commonly used wireless network protocols, is typically associated with wireless internet access and local area networking of devices. The growth in number of Wi-Fi enabled networks around the world to comprise of tens of billions of connected devices has opened up a new range of possibilities for application of Wi-Fi technology other than providing wireless internet access and communication. One promising and tangible application of Wi-Fi signals is that of using it for motion sensing, which has practical applications including use in in security systems.

Wi-Fi sensing has been developed over recent years as an alternative way to monitor places. It has various advantages over other sensing solutions. In some forms, it does not need any extra hardware but can rely on existing Wi-Fi routers and Wi-Fi enabled devices in a place. For example, active radar systems require dedicated antennas and transceivers that are complex and costly, while Wi-Fi sensing uses existing devices like cell phones, PCs, and mesh Wi-Fi systems. A user need only to install the required software to transform their setup into a Wi-Fi sensing solution.

Wireless signals, for example Wi-Fi signals, can be used to sense an entity by monitoring changes in signal characteristics. The use of wireless signals in presence detection has the advantage that no cameras need to be used, and therefore the privacy of those being sensed is maintained.

Wi-Fi signals penetrate through walls, enabling out of line-of-sight (LOS) operation, an important consideration for security monitoring applications.

Wi-Fi sensing is innately cost-effective due the near-ubiquitous nature of Wi-Fi. Wi-Fi is widespread, so the infrastructure is already in place. There is no need to build a new ecosystem because the IoT (Internet of Things) provides the perfect ecosystem for a sensing system.

Wi-Fi sensing has been found to be surprisingly accurate. Channel State Information (CSI) is collected from the packets and signals used for transmitting and receiving information from regular devices connected via a Wi-Fi network. This technology does not require any additional specialized signals, nor does it degrade network performance or the user experience when using Wi-Fi.

Wi-Fi sensing systems have been shown to be effective for the purposes of security. That is, they may provide sensed data relating to a place by means of which a user of a client device remote from that place may monitor sensed events at a user interface of his local device.

SUMMARY

A mobile application has been developed to provide a user interface through which a user may set up, monitor and control Wi-Fi sensing systems. Users may set up a plurality of Wi-Fi sensing systems in a plurality of places, such as in their home, their place of work and their parents' house, for example. In this example, the user may have an account on the mobile application, the account associated with the three locations. The user may log in to a particular "location profile" associated with their account to view Wi-Fi sensing data associated with the selected location. If a user wishes to monitor Wi-Fi sensing data for a different location, the user must log out of the first location profile and select a different one.

This mobile application for monitoring data generated by Wi-Fi sensing systems requires that a user views data on a location-by-location basis. That is, only one place may be monitored at any given time by the user through the application. The inventors have recognised that this poses limitations when used for security purposes. The following describes a system and method for implementing a monitoring system which addresses these problems.

To address this and other problems associated with monitoring systems, certain embodiments of the monitoring system described herein enable a user to know, at a glance, essential monitoring information about all the places associated with his account, provided he has the right user role in each of the places. In certain embodiments, the user will be alerted whenever an intrusion is detected in one of these places. To enable a user to get deeper insights about the activity of a place, in certain embodiments the system can proceed to a dedicated place monitoring screen containing information which can be provided by a monitoring system which includes various sensing and other capabilities: motion sensing, occupancy sensing, and geofencing. Assuming that a user is monitoring the place using his computer device, such as a mobile phone, geofencing can enable the system to know if a user's mobile phone is in the location or not. If a user wishes to access deeper insights of a different place, the system may enable him to switch from a multiple-place view to select a particular-place view.

In certain embodiments, each location may support multiple users, wherein each user may have a defined role with associated access credentials. There may be different roles, going from a most permissive one with access to all settings and credentials, to a least permissive one with no access to any kinds of settings or sensing insights of the location. In some embodiments, there are two ways for a user to access a location: he can either create one or be invited into one.

According to one aspect of the invention, there is provided a monitoring system for monitoring a plurality of places at separate geographical locations, the monitoring system comprising:

a computer device having a user interface configured to receive an identifier of a monitoring user;

a processor configured to process multiple streams of sensed data, each stream of sensed data comprising sensed data for a respective one of the plurality of places and indicative of one or more sensed events in the respective place, to generate display data for display at the user interface of the computer device, wherein the displayed data comprises a respective visual representation of a set of data for each of the plurality of places, the processor configured to simultaneously render at the user interface at least two of the sets of data associated respectively with at least two of the plurality of places associated with the monitoring user.

In some embodiments, the computer device comprises a network interface configured to receive sensed data from each of the plurality of places, wherein the sensed data is derived from a Wi-Fi sensing system at the respective place. In such an embodiment, the sensed event may be indicative of motion and/or presence of a living being in the place.

In some embodiments, the living being is a person or animal.

In some embodiments, the network interface is configured to receive geolocation data of one or more persons at each of one or more of the places. In such an embodiment, the processor may be configured to store the received geolocation data for each person and to record an indication of the most recent place where that person was located, based on the geolocation data.

In some embodiments, the processor is configured to render on the display a visual indication of the most recent place where one or more persons were located in association with a graphical indicator of that person.

In some embodiments, the visual identifier comprises a graphical icon associated with that person.

In some embodiments, the user interface is configured to receive an authenticator associated with the monitoring user, and the processor is configured to authenticate the monitoring user based on the authenticator.

In some embodiments, the monitoring system comprises a computer server which is configured to provide a communication path which is configured to communicate with the computer device, the server being arranged to receive sensed data from each of the plurality of places and to transmit the sensed data to the computer device. In such an embodiment, the monitoring system may comprise computer memory which stores for each person of a plurality of people a set of one or more places associated with that person, whereby each person is authenticated as a monitoring user of each of the places associated with that person.

In some embodiments, the server comprises a computer memory which stores for each person of a plurality of people a set of one or more places associated with that person, whereby each person is authenticated as a monitoring user of each of the places associated with that person.

In some embodiments, the monitoring system comprises computer storage within which is stored a security contacts list comprising contact identifiers of a group of people with monitoring user access to the plurality of places, whereby each person on the security contacts list is authenticated as a monitoring user for the plurality of places.

In some embodiments, the processor is configured to render on the display an occupancy status associated with each of the places based on the sensed data.

In some embodiments, the processor is configured to render on the display an activity status for each of the places based on the sensed data.

According to another aspect of the invention, there is provided a method of monitoring a plurality of places at separate graphical locations, each place having a Wi-Fi sensing system installed at the place, the method comprising:

receiving at a user interface of a computer device an identifier of a monitoring user associated with the plurality of places;

authenticating the identifier of the monitoring user;

responsive to authentication of the monitoring user, generating display data for display to the monitoring user, the display data generated from multiple streams of sensed data, each stream comprising sensed data from the Wi-Fi sensing system from each respective place and indicative of a sensed event in the place; and simultaneously rendering on a display at least two sets of display data associated with at least two of the plurality of places associated with the monitoring user, where each set of display data is rendered using a visual representation for each of the plurality of places.

In some embodiments, each visual representation is visually distinct for each place, e.g., by colors. In such an embodiment, the method may further comprise receiving a user selection of one of the visual representations and, responsive to the user selection of that visual representation displaying one or more of occupancy status and activity status based on the sensed data.

The system and methods described herein enable a home security social network platform. The system and methods are particularly useful for individual house residences and small business owners.

Existing home security social networks provide each person with a list of contact identifiers for that person, who are known and/or trusted by that person. Nowadays, people readily share their data, location, connections etc. The systems and methods described herein enable a social network of an individual person to be leveraged to provide additional assistance in monitoring a place.

Another aspect of the invention provides a transitory or non-transitory computer readable media on which are stored computer readable instructions which when executed by a hardware processor of a computer device implement a method of monitoring a plurality of places at separate graphical locations, each place having a wireless sensing system installed at the place, the method comprising:

receiving at a user interface of a computer device an identifier of a monitoring user associated with the plurality of places;

authenticating the identifier of the monitoring user;

responsive to authentication of the monitoring user, generating display data for display to the monitoring user, the display data generated from multiple streams of sensed data, each stream comprising sensed data from the wireless sensing system from each respective place and indicative of a sensed event in the place; and simultaneously rendering on a display at least two sets of display data associated with at least two of the plurality of places associated with the monitoring user, where each set of display data is rendered using a visual representation for each of the plurality of places.

The monitoring system may be configured to operate in one or more of a plurality of installation contexts.

The monitoring system may comprise access rights storage which stores for each of a cluster of people access rights associated with each person, the access rights including administrative rights at different levels of access and an indication that no access is permitted. The access rights storage may be provided by suitable computer memory at a client device or server.

BRIEF DESCRIPTION OF DRAWINGS

For a better understanding of the present invention and to show how the same may be carried into effect, reference will now be made by way of example to the accompanying drawings in which:

FIG. 7 shows an exemplary data structure comprising data for a plurality of users.

DETAILED DESCRIPTION

Wireless communication systems may be used for motion detection. A wireless communication network uses a set of wireless communication channels which are provided between devices of the wireless communication network. Signals may be transmitted over the wireless communication channels from a transmitter device to a receiver device to enable changes in an environment to be sensed. Various different technologies can be utilised for the wireless communication channels and the signals which are transmitted and received. For example, signals used in telecommunication environments such as WCDMA (wide band code division multiple access), LTE (long term evolution) and telecommunication signals according to the third generation, fourth generation and fifth generation protocols (3G, 4G and 5G). Other technologies may be utilised, such as Bluetooth and WiFi. The wireless communication network described herein is described utilising WiFi sensing as the implementation technology of the wireless communication network. However, it will be appreciated that other wireless communications protocols (for example those described above) may be utilised.

The following description relates to a monitoring system which uses a security tool configured to provide a series of user interfaces which generate visual representations of Wi-Fi sensing data to a user in real-time. Herein the word "place" is used to denote a monitored location, such as a home, office, etc. A user may have a plurality of places relevant to him, each relevant place having a Wi-Fi sensing system installed therein. Note that the Internet of Things (a network of interconnected devices, including every-day devices like smartphones, smart TVs and smart watches in a particular place) provides a digital ecosystem capable of supporting a Wi-Fi sensing system. The user may log in to a personal profile on a mobile application or web interface of a user device, whereafter a plurality of visual representations corresponding to that user's plurality of relevant places may be rendered on the user interface. That is, the user may simultaneously monitor Wi-Fi sensing data for the plurality of relevant places without having to log in to a different user interface that is specific to a particular place each time he wants to monitor a different place. Multiple users may be linked, for example by having one or more place that are mutually relevant. However, each user only sees visual representations corresponding to places relevant to them. Each visual representation in the user interface that comprises the plurality of relevant places may be selectable to view a more detailed report of the Wi-Fi sensing data and systems corresponding to the selected place, as is described in more detail with respect to FIGS. 1-3.

Figure 1:
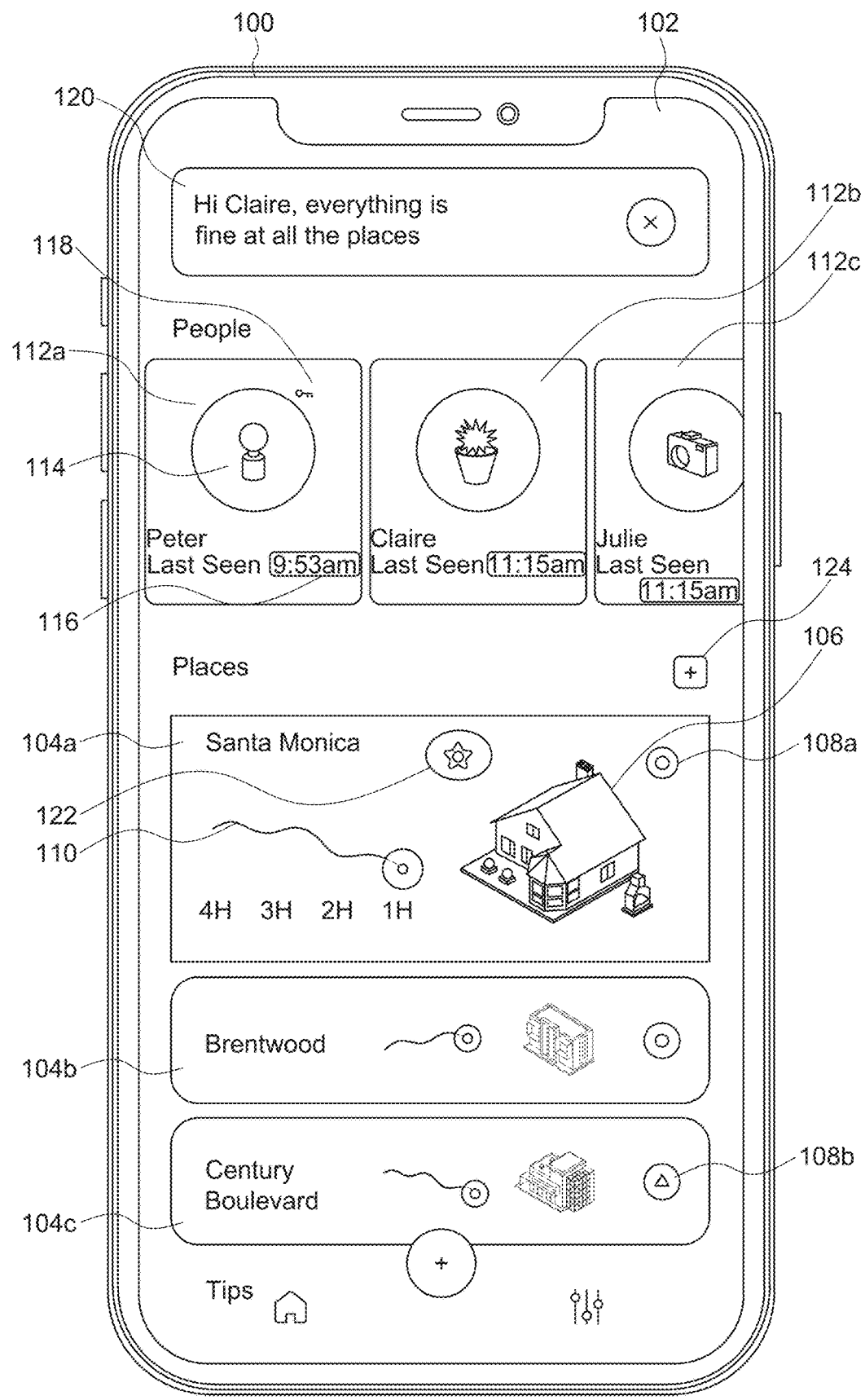
FIG. 1 shows a user interface configured to provide to a user visual representations of multiple Wi-Fi sensing systems in multiple locations.

FIG. 1 shows an exemplary user device 100 displaying a user interface 102, the user interface 102 configured to provide visual representations of analysis performed by one or more Wi-Fi sensing systems in one or more locations to a user operating the user interface 102 in real-time. That is, a user may install one or more Wi-Fi sensing system in one or more location or place. The Wi-Fi sensing systems generate sensed data for processing at the user device and/or in the cloud. The Wi-Fi sensing systems may be controlled via a mobile application or web interface of the user device.

For the purposes of the following description, the term "operating user" refers to a user for whom the user interface is provided, and the term "other user" refers to a user with whom the operating user is linked. Note that the term "operating user" does not imply a level of authority or increased control of the system compared with other users; the term is merely used in the description of FIGS. 1-3 to distinguish the user for whom the user interface is generated from other users with whom the operating user is connected. That is, other users may themselves be considered operating users of the user interface 102 when the user interface is rendered on their own device and is configured to provide analysis relevant to those other users. Note also that the user interface 102 is configured for each user based on locations relevant to them (or in which they have installed Wi-Fi sensing systems). The term "instance" of a user interface refers to a particular version of the user interface configured for a particular user.

The user interface 102 may be configured to provide, to the operating user, visual representations of Wi-Fi sensing data for multiple places relevant to the operating user. For example, the operating user may have a Wi-Fi sensing system installed at more than one relevant place, such as, by way of example, their home, their place of work and/or the home of a friend or relative. User interface 102 may allow the operating user to monitor activity within the places relevant to them by viewing visual representations of Wi-Fi sensed data generated for each of the places.

In the present description, the term "place" is used interchangeably with "location" to mean an environment monitored by a Wi-Fi sensing system. In the example of FIG. 1, user interface 102 includes three location cards 104*a*, 104*b* and 104*c*, each location card 104 associated with a particular location relevant to the operating user and comprising an overview activity graph 110, which provides a simplified visual representation of Wi-Fi sensed data for its associated particular location. Each location card 104 further includes a location graphic 106 and a mode icon 108. Such mode icons are used to indicate the kind of action leveraged by the sensing system upon the sensing data. A mode icon example may include an alert status icon indicating that an intrusion has been detected in a location. Provision of a plurality of location cards 104, each providing visualisations of Wi-Fi sensing data in real-time, enables a user to quickly determine the state of a plurality of locations simultaneously and to quickly identify anomalous patterns.

In the example of FIG. 1, location card 104*a* corresponds to a first location, identified by a unique identifier rendered on the display e.g., "Santa Monica", which may be the family home of the operating user. Location card 104*a* further includes a location graphic 106, which may indicate the type of location associated with the location card, e.g., house, office, apartment, etc. Location card 104*a* includes a location graphic 106 which resembles a home. Location graphics 106 may be selected by a curator or moderator user in a setup phase of the user interface 102, following installation of one or more Wi-Fi sensing system; moderator users are described later herein.

Location card 104*a* further includes a mode icon 108*a*, which indicates a mode for the corresponding place.

The system described herein uses different modes to define the way the system reacts to sensed events in a zone. For example, by sending notifications to client devices and/or triggering deterrent action, such as an alarm. Modes can be defined at a zone level, which means that a place can contain multiple zones each using a distinct mode. They can be used to illustrate security scenarios, as well as energy efficiency, automation and wellness scenarios.

User interface 102 further includes location cards 104*b* and 104*c*, which are respectively associated with an apartment and a place of work. Each of location cards 104*b* and 104*c* includes an overview activity graph 110 and a mode icon 108, each activity graph 110 providing a visual representation of Wi-Fi sensing data for a corresponding location.

Each location card comprises a mode icon 108. For example, location card 104*a* comprises mode icon 108*a*, and location card 104*c* comprises mode icon 108*b*. A particular mode icon 108 may be associated with one or more user preference pertaining to alerts in the corresponding location. For example, a user may choose to have relaxed alert preferences in one place, but more active alert preferences in another place. That is also true for different zones inside the same location. A particular mode icon 108 may be selected from a plurality of mode icons 108 by a curator or moderator user in a setup phase of a location card 104, each mode icon 108 in the plurality thereof being visually distinct, for example by colour, texture and/or shape.

In the example of FIG. 1, the mode icon 108*a* is rendered as a circle on the location card 104*a*. Note that the mode icon 108*a* may also include a visual indicator such as a color (e.g., green). The mode icon 108*a* indicates that alerts are not active in the corresponding location. That is, a green circle mode icon may indicate a "relaxed mode", wherein activity is monitored and recorded, but alerts are not activated, and notifications of activity are not sent to client devices.

Mode icon 108*b* is rendered as a triangle on the location card 104*b*. Note that the mode icon 108*b* may also include a visual indicator such as a color (e.g., red). The mode icon 108*b* indicates a high level of alert in the corresponding location. That is, a red triangle mode icon 108 may indicate an "alert mode", wherein activity is monitored and recorded, notifications are sent to relevant client devices, and deterrent actions such as sirens and calls to services such as the police may be triggered upon identification of worrying activity in the corresponding location.

It will be appreciated that the alert preferences associated with the mode icons 108*a* and 108*b* are described by way of example, and other preferences may be implemented. For example, one or more intermediate mode icon, with alert preferences between the extremes of the relaxed mode and alert mode described above, may be assignable. By way of example, the Wi-Fi sensing system of a particular location may be configured in an "aware mode", wherein notifications of detected presence are sent to client devices, but deterrent actions are not implemented. The exemplary "aware mode" may be associated with a particular mode icon 108, for example an orange triangle.

Note also that each location card may comprise a visual representation which has a visual indicator 122, which may be rendered on the user interface 102 as a colour or texture, and which enables the operating user to more easily distinguish between different location cards 104. The visual indicator 122 of a particular location card 104 may also be used to associate a particular user with the particular location, as described later herein.

Each location card 104 may be a selectable user interface feature which, when selected, causes a location-specific interface to be rendered, the location-specific interface providing a more detailed and more interactive means of monitoring Wi-Fi sensed data for the location corresponding to the selected location card 104. Location-specific interfaces are described later with reference to FIGS. 2 and 3.

Figure 4:
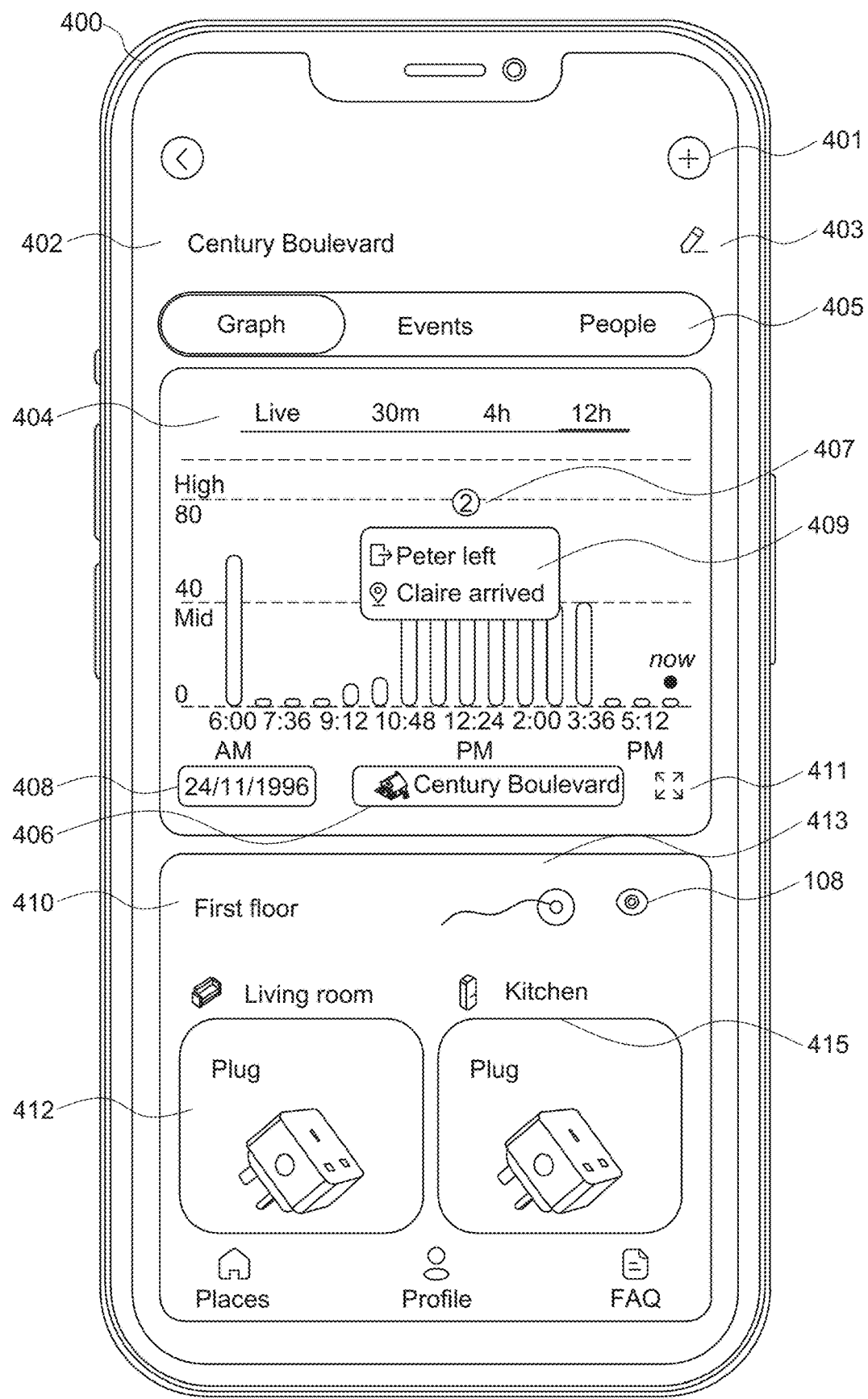
FIG. 4 shows another example of the user interface shown in FIG. 2, wherein the location interface is arranged in three folds: graphs, events, and people.

The user interface 102 further comprises an add place button 124. The add place button is a selectable user interface feature which, when selected, allows a user to set up a new location card 104 corresponding to a new location in which a Wi-Fi sensing system is installed. The setup phase for a new location is illustrated in FIG. 4, as described later herein.

An operating user may be linked with one or more other user, for example, family members, friends, or housemates etc., forming a cluster of users. Members of a cluster may have one or more location in common. Therefore, each instance of the user interface 102, corresponding to each user in a cluster, may show one or more common location card 104. Note, however, that a particular location may be common to some or all users in a cluster or may be specific to a particular user; that is, a cluster of users may not necessarily have all locations in common.

It will be appreciated that a user may be part of more than one cluster. For example, a user may be part of a first cluster with their spouse and children, and part of a second cluster with their brother and parents. The users in the first cluster may not have access to Wi-Fi sensed data pertaining to users in the second cluster, or the locations relevant to the users in the second cluster.

The user interface 102 of FIG. 1 comprises three user cards, 112*a*, 112*b* and 112*c*, each user card 112 corresponding to a user within a cluster, of which the operating user in FIG. 1 is a member. A user card 112 may also be generated for the operating user of the instance of the user interface 102; that is, users may see a user card representing themselves. In the example of FIG. 1, the user card 112*a*, corresponding to user "Peter", comprises a profile image 114, a whereabouts indicator 116, and a moderator key 118. The profile image may be a photograph or other image provided by the user, or may be a graphical object selected by the user from a plurality of pre-designed graphical objects. For example, the profile image corresponding to user Peter is a lightbulb graphic.

User card 112a comprises a whereabouts indicator 116, the whereabouts indicator including the visual indicator 122 associated with the location at which the associated user (Peter) was last detected by a Wi-Fi sensing system. The whereabouts indicator 116a may further comprise text indicating a time at which the user was last seen, or a length of time since the user was detected at a particular location. Note that the visual indicator 122 associated with a location at which a particular user is most recently detected may also be incorporated into the profile image 114 of that particular user. In the example of FIG. 1, visual indicators 122 are displayed in the background of the profile image 114 for each user. Note that detection of a particular user by the Wi-Fi sensing system may be done using a GPS tracking system of a mobile user device, the GPS system being coupled to the application that is configured to provide the user interface 102.

User card 112a further comprises a curator key 118, which indicates that the user represented by user card 112a (Peter) is a curator or administrator for the user cluster. That is, the moderator key 118 may indicate to other users that Peter has administrative control over the associated Wi-Fi sensing systems, and that Peter may decide to whom each location is accessible in each user's instance of the user interface 102. The user interface 102 comprises two further user cards, 112b and 112c, corresponding to users "Claire" and Julie" respectively. Note that Claire and Julie may have reduced administrative control over the Wi-Fi sensing systems compared to Peter.

Other user types may also exist. For example, there may be users who are known and identifiable by the Wi-Fi sensing systems, but who do not have access to an instance of the application. These users are referred to herein as "steward" users, and may include people such as, for example, babysitters, gardeners, cleaners, neighbours, carers or any other person who is linked with the users in a non-personal way. Similarly, toddlers, young children and pets may be identifiable entities that are sensed by the Wi-Fi sensing systems, but these entities do not have access to the user interfaces described herein.

It will be appreciated that a particular person may be a different type of user in different clusters. For example, a user may be a curator within their family cluster, they may then be a standard user in a different cluster (extended family, for example) and may also be a steward user in a different cluster.

In the example of FIG. 1, the user interface 102 has recently been loaded. Upon opening the user interface, an overview notification 120 may be rendered on the surface of the user interface 102 as a pop-up alert or banner. The overview notification 120 comprises text which may confirm that no noteworthy activity has been detected, or may identify one or more of the multiple locations relevant to Claire at which anomalous, unexpected, worrying or otherwise noteworthy activity has occurred. In the example of FIG. 1, the overview notification reads, "Hi Claire, everything is fine at all the places". Note that the overview notification is addressed to Claire, who is the operating user of the instance of the user interface 102 shown in FIG. 1.

Figure 2:
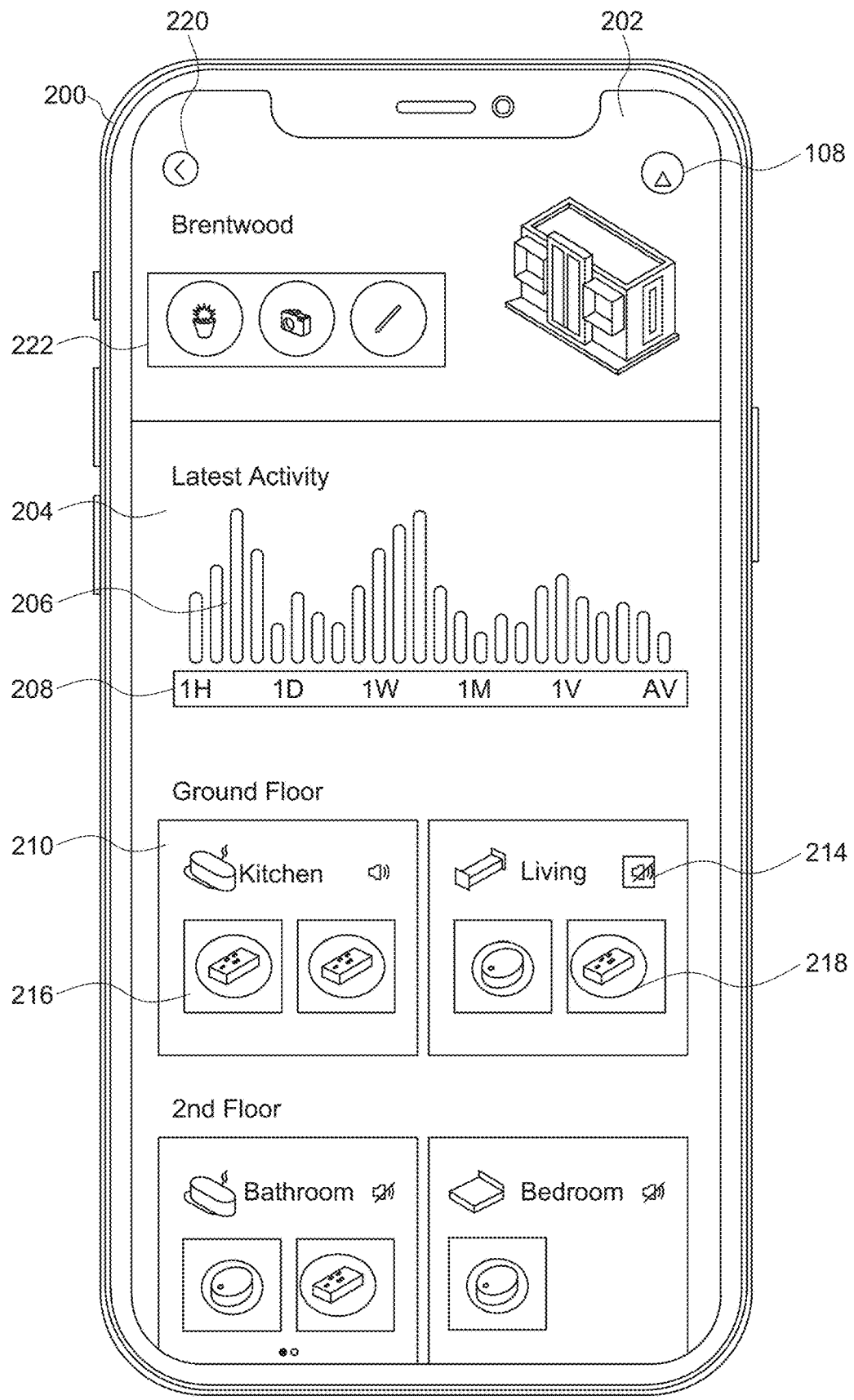
FIG. 2 shows a user interface through which visual representations of a particular Wi-Fi sensing system in a particular location are provided.

FIG. 2 shows an exemplary location-specific interface 202 rendered on the same user device 100 as in FIG. 1, and the location-specific interface 202 presented upon selection of the location card 104b shown in FIG. 1, which corresponds to the location labelled "Brentwood". The location-specific interface 202 comprises a plurality of user profile images in a region denoted 222. The profile images associated with a particular user may be displayed in the region 222 of the location-specific interface 202 when that user is present at the location.

The location specific interface 202 comprises an activity card 204, the activity card 204 further comprising a detailed chart 206 and a corresponding timeframe selector 208. The detailed chart 206 is a visual representation of activity data generated by a Wi-Fi sensing system, and includes data in a timeframe determined by the timeframe selector 208. Timeframe selector 208 comprises a plurality of selectable features configured to modify the detailed chart 206 by changing the timeframe within which activity data is presented. For example, the timeframe selector 208 comprises selectable features labelled: "4H", "1D", "1W", "1M", "1Y" and "all" which, when selected, respectively modify the detailed chart 206 such that it provides activity data from the past four hours, one day, one week, one month, one year, or for as long as the data has been recorded. A mode icon 108 is also rendered on the location-specific interface 202, indicating the alert preferences for the Brentwood location.

The location-specific interface 202 further includes a plurality of room cards 210, each room card 210 corresponding to a room of the selected location, in which one or more Wi-Fi sensing device has been installed. It will be appreciated that a general location-specific interface may comprise one or more room card, depending on the number of rooms monitored by a Wi-Fi sensing system. Each room card 210 may comprise a sound level indicator 214, which indicates the volume level of alarms and sirens in the associated room in the event that an alarm is triggered. In the example of FIG. 2, the living room, bathroom and bedroom are in a silent mode, as indicated by the cross through the sound level indicator 214. The sound level indicator 214 corresponding to the kitchen includes two "bars", indicating that a loud alarm is to be sounded in the kitchen if an alert is triggered. Note that a sound level indicator 214 may be configurable to other volume levels, such as one bar (indicating moderate alarm volume) or three bars (very loud alarm volume). The state of a sound level indicator 214, and therefore an associated user preference of alarm volume, may be configurable by the curator or moderating user.

Each room card 210 may further comprise one or more device panels 216, each device panel 216 representing a Wi-Fi sensing device physically located in the corresponding room. In the example of FIG. 2, the room card 210 labelled "Kitchen" comprises two device panels 216, indicating that the kitchen in the "Brentwood" location comprises two Wi-Fi sensing devices. In another example, the room labelled "Bedroom" comprises one device panel 216, indicating that one Wi-Fi sensing device is physically located in the bedroom of the Brentwood location.

Each device panel may further include a device-specific alarm indicator 218. A device-specific alarm indicator 218 may include a colour, texture, shape or other visual property which indicates the state of the associated device. A subset of the one or more devices in a particular room may be configured to sound an alarm. Similarly, a subset of the one or more devices in a particular room may be configured to not sound an alarm. The device-specific alarm indicator 218 indicates whether the associated device is configured to sound an alarm when an alert is triggered.

It will be appreciated that the sound level indicator 214 of a particular room may determine the alarm volume of the devices in that room that are configured to sound an alarm. This holds for rooms which are configured in silent mode; that is, if a room is in silent mode, no alarm is sounded, even by devices with a device-specific alarm indicator 218 state which indicates an alarm is to be sounded when an alert is triggered.

The location-specific interface 202 may arrange the room cards 210 in zones. For example, each room card 210 may be associated with a particular zone and rendered on the user interface 202 alongside other room cards which share the same zone. In the example of FIG. 2, there are two zones: "Ground Floor" and "2nd Floor". Zones may be created by a user in a setup phase, and rooms may subsequently be assigned to a particular zone upon creation of a new room within the application. It will be appreciated that a single room may constitute a zone if there is a standalone Wi-Fi sensing system therein.

Devices that are part of the same zone may be able to act as beacons and/or listen to other Wi-Fi sensing devices in that zone. If a device in a particular zone is unable to communicate effectively with other devices in that zone, the application may suggest that a separate zone be created. It will be appreciated that such suggestions may only be made to a curator user.

The location-specific interface of FIG. 2 further comprises a "return" icon 220 which, when selected, may cause the user interface 102 of FIG. 1 to be rendered on the user device 100.

Exemplary features of Wi-Fi sensing systems include, but are not limited to: security, automation (e.g., lighting and heating), energy saving and wellness monitoring. Such features may be provided on a granular basis through the application. That is, security, automation and monitoring systems may be enabled on a zonal or room-by-room basis. For example, a lighting automation function may be permanently enabled in a basement zone, but not in an upstairs zone. Similarly, an alarm system for a garage room may remain enabled though an alarm system rest of the downstairs zone is not enabled, even if one or more person is in the building.

Wellness monitoring systems may be used to monitor people who are vulnerable. In one example, an alert may be sent to one or more relevant user device if a particular user (a grandparent, for example) spends an unusually long time in the bathroom. In another example, pets may be monitored.

Figure 3:
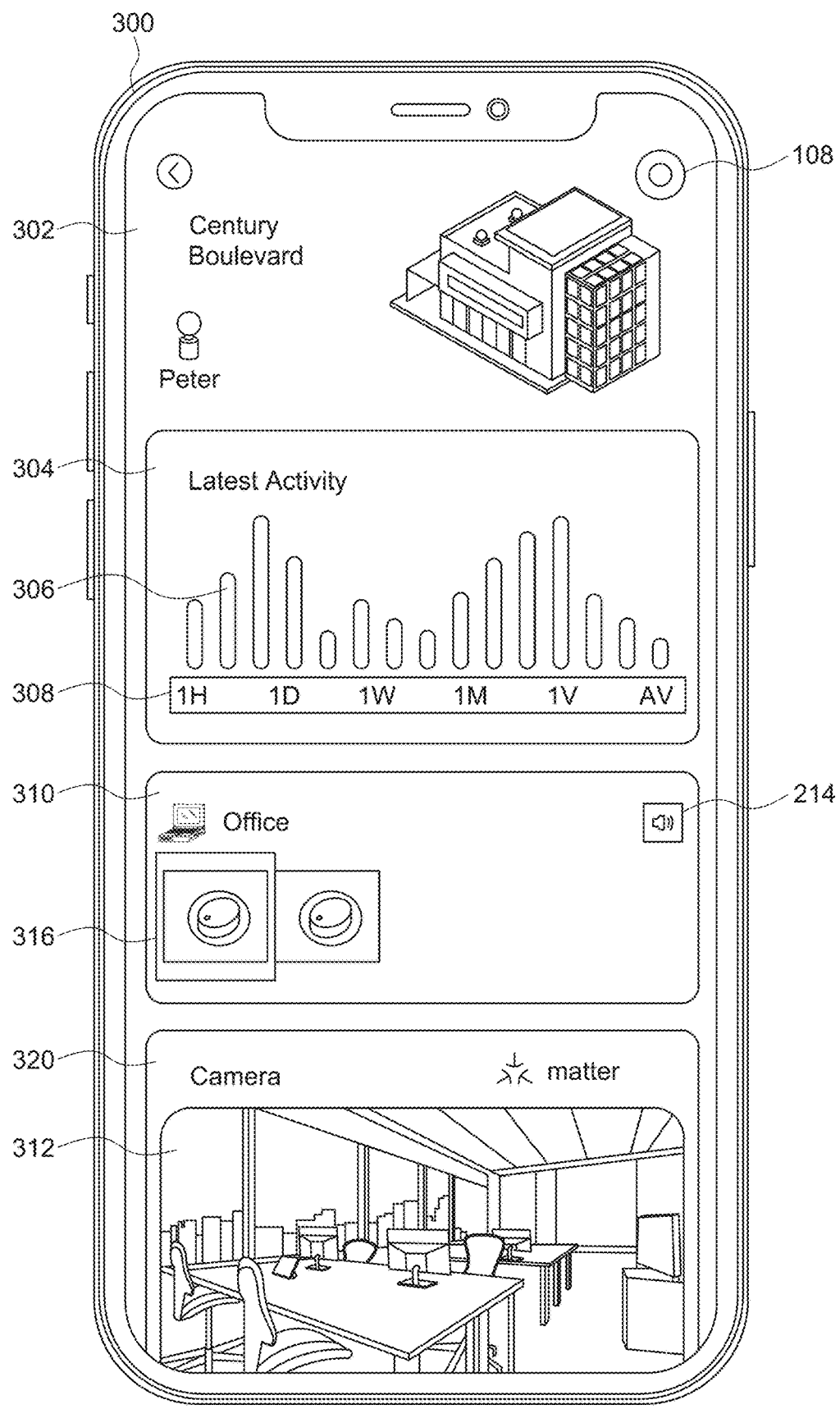
FIG. 3 shows another example of the user interface shown in FIG. 2, wherein the user interface is provided for a different location.

FIG. 3 shows the user device 100 of FIGS. 1 and 2, now displaying a different location-specific interface 302. In the example of FIG. 3, location-specific interface 302 is presented upon selection of the location card 104c shown in FIG. 1, which corresponds to the location labelled "Century Boulevard"; this location is a place of work. The location specific interface 302 comprises an activity card 304, the activity card 304 further comprising a detailed chart 306 and a corresponding timeframe selector 308. Similar to the example of FIG. 2, the detailed chart 306 of FIG. 3 is a visual representation of activity data generated by a Wi-Fi sensing system that is physically located in the Century Boulevard location and includes data in a timeframe determined by the timeframe selector 308.

The location-specific interface 302 includes a room card 310 corresponding to an office room, the room card 310 comprising two device panels 316, each device panel representing a Wi-Fi sensing device that is physically located within the office room of the Century Boulevard location. Note that the office room card 310 comprises a sound level indicator 214, which includes two bars. This indicates that triggered alarms are configured at a loud setting. However, in the example of FIG. 3, the mode icon 108 is set to relaxed mode, and both devices in the office room are set to silent.

It will be appreciated therefore that alarms are not sounded when an alert is triggered in the example of FIG. 3.

The location-specific interface 302 further comprises a camera card 320, the camera card 320 configured to provide a real-time video or image feed 312 of the associated location to the user. The video or image feed 312 may be CCTV video or iteratively updated images of the selected location. In some embodiments, the video or image feed 312 may be a selectable feature of the location-specific interface 302 which, when selected, opens a full-screen viewing mode on the user device 300. In such an embodiment, video or image data may be stored at a plurality of quality levels (e.g., frame rates and/or resolutions), wherein reduced quality video or imagery, requiring less bandwidth, is automatically presented alongside other features of the location-specific interface through the feed 312 of the camera card 320. A higher quality version of the video or image content may then be accessible upon selection of the video or image feed 312.

FIG. 4 shows one more variation of the interface, organised in three folds: graphs, events, and people 405. The graph fold presents sensing data of the location (motion statistics, occupancy analytics), both historical and live. Users can switch between different sources of data depending on what they are looking for 405, they can also select the desired timeframe 404 and desired date 408 for graphs. For deeper insights, they can also open the expanded view of the graph 411. Each zone has its own dedicated block in the place screen, like the first floor 410 here composed of two rooms, living room and kitchen 415. Each room contains one device, and the user can tap on the device block to land on a specific page related to the device 412. The user can choose the mode of the zone using the mode selector 108. Depending on his access rights, the user will have the possibility to edit the place settings 403 and add devices to the place 401.

The events fold presents the past events that happened in that location, wherein detailed reports are saved for notorious events (for example: intrusion). There, events can be filtered depending on their category and their date, they can also be managed (archived or deleted). The people fold presents users attached to the location, and their role inside the location. Each user will have a defined role for each location, with different access rights to the features and settings of the location. For example, the administrator role may allow a user to manage the location settings, and manage the location users (invite a user in the location, change a user role in the location, remove a user from a location) and give full access view of the sensing data of the system for the mentioned location. The family member role may allow such access view, but does not allows access to the location settings and user management possibilities. The steward role may not allow any access to settings and view to the sensing data of the location.

Interactions are possible between folds 404, for example events summary are also displayed on the graphs. Tapping on the event bubble on top of a specific time 407 opens a summary of the events that happened at that time 409. Tapping on the summary directs the user to the event fold. Geofencing allows to detect events such as a user leaving or entering a location 409. Geofencing is implemented by the system detecting a user location, for example based on the location of a mobile device associated with the user. Many mobile devices are equipped with geo-sensors which allow their location to be monitored and detected, for example using satellite location.

Figure 5:
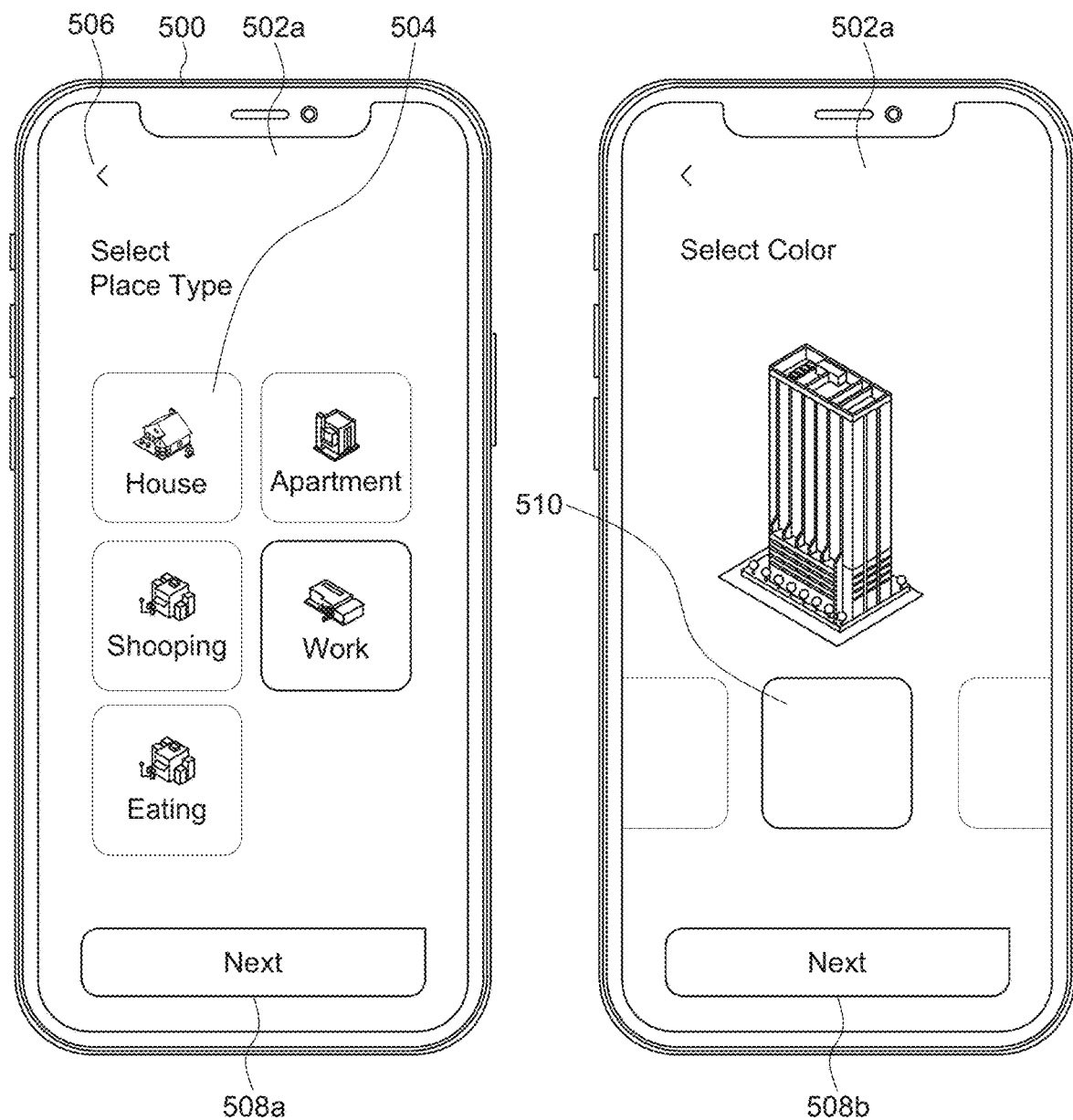
FIG. 5 shows two exemplary user interfaces configured to provide a setup phase for a location in which a Wi-Fi sensing system is installed.

FIG. 5 shows a computing device 500 displaying a series of user interfaces configured to assign graphical indicators to a newly created or edited location. FIG. 5 shows a first user interface 502a, wherein a particular place type may be selected from a plurality of place types. Each place type may be represented as a selectable user interface feature which can be selected to assign a corresponding place type. Each place type 504 may further be associated with a particular place icon, which may be a graphical representation of the associated place type. In the example of FIG. 5, the place types labelled: house, apartment and shopping, are respectively associated with graphically rendered images of a house, an apartment and a shop. It will be appreciated that the first user interface 502a of FIG. 5 may be rendered on the display of the computing device 500 upon selection of the add place button 124, as shown in the user interface 102 FIG. 1. The first user interface 502a further includes a "back" button 606 which, upon selection, may return the user to the user interface through which they accessed the first user interface 502a, such as the user interface 102 of FIG. 1.

The first user interface 502a includes a first "next" button 508a, which is a selectable user interface feature which, when selected, causes a second user interface 502b to be rendered on the display of the computing device 500, the second user interface 502b being generated based on the place type 504 selected on the first user interface 502a. It will be appreciated that in some embodiments, the first next button 508a may only become selectable upon selection of a particular place type 504. In other embodiments, a default place type may be pre-selected upon rendering of the first user interface 502a, and selection of the first next button 508a may simply render the second user interface 502b corresponding to the default pre-selected place type.

The second user interface 502b is configured to allow a user to select a further visual indicator to be assigned to the newly created or edited location. In the example of FIG. 5, the second user interface 502b allows a user to select a colour 510. A visual indicator selected in the second user interface 502b may subsequently be assigned to a location cards 104a-c displayed in the user interface 102 of FIG. 1, the location card 104 corresponding to the newly created or edited location. Note that the second user interface 502 also includes a back button 506 which, when selected, may cause the first user interface 502a to be rendered, allowing a user to, for example, select a different place type 504. The second user interface 502b further includes a second next button 508b which, when selected, may causes a third user interface to be rendered on the display of the computing device 500, the third user interface allowing further aspects of the new or edited location to be assigned. For example, an example of third user interface may be a user interface configured to allow a curator user to grant access to other users to see the Wi-Fi sensed data pertaining to the associated location. In other embodiments, selection of the second next button 508b may cause the user interface 102 of FIG. 1 to be loaded on the computing device 500, the user interface 102 of FIG. 1 including a location card 104 corresponding to the newly created or edited location, including visual indications as assigned in the first and second 502a, 502b user interfaces of FIG. 5.

The application configured to provide the user interfaces described herein may further allow configuration of automation, energy saving, security and other features which a Wi-Fi sensing network is capable of providing. For example, on a zonal or room-by-room basis, a user may configure energy saving and comfort preferences for heating, ventilation and air conditioning (HVAC) systems, configure soft security settings such as lighting settings (such as timer systems), and control other automated systems such as, for example, automatic closing of blinds and/or curtains. In some embodiments, recognition by the Wi-Fi sensing systems of the behavioural patterns of inhabitant users may be used to automatically configure preferences of the above Wi-Fi sensing features.

Figure 6:
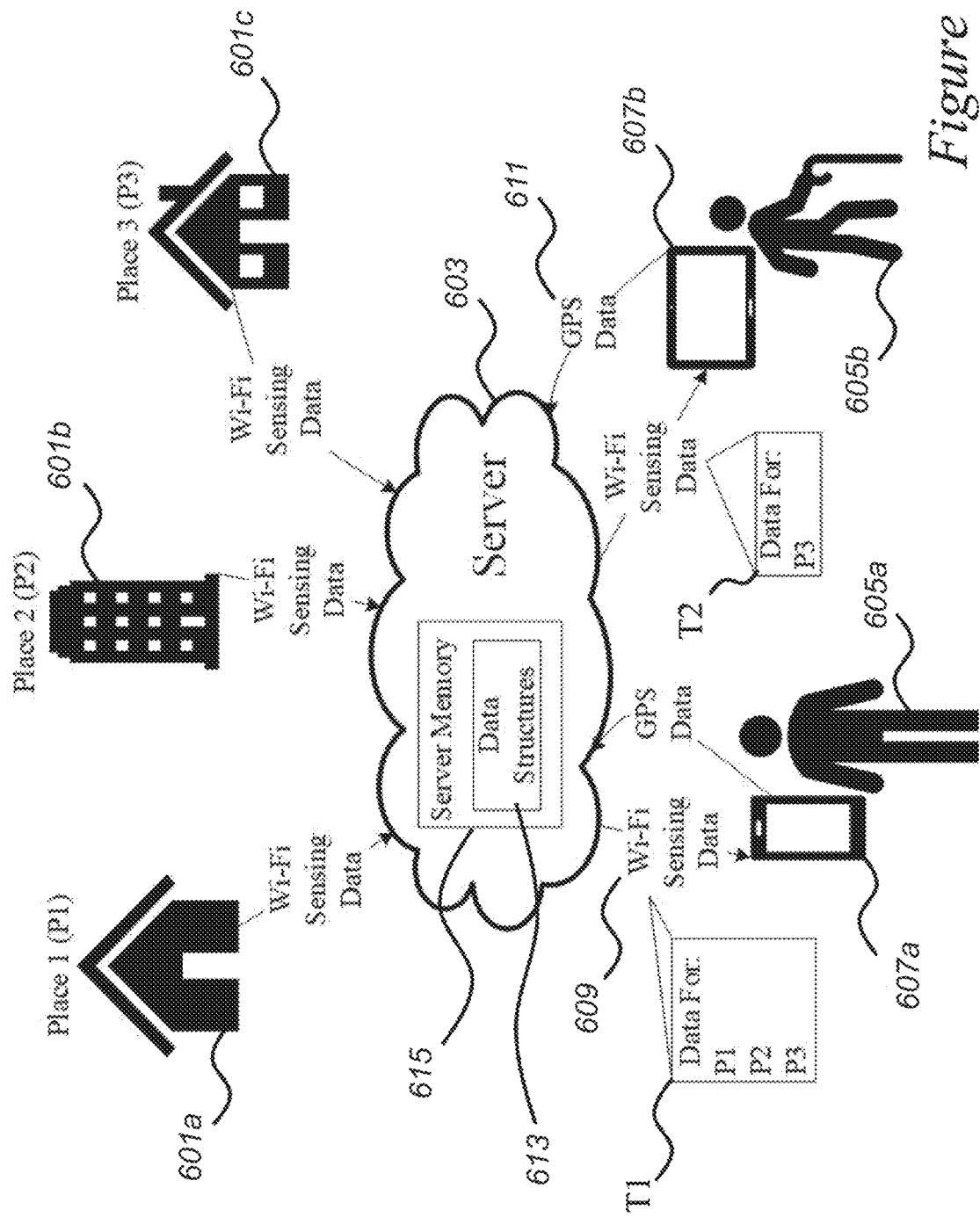
FIG. 6 shows an exemplary overall environment in which multiple client devices and multiple Wi-Fi sensing systems are in communication with a server.

FIG. 6 portrays a highly schematic diagram of an overall environment in which one or more client device communicates with one or more Wi-Fi sensing system in one or more place or location via a server 603. FIG. 6 shows three places: Place 1 601a, Place 2 602b and Place 3 601c, each place 601 in the diagram representing a real location which comprises a Wi-Fi sensing system. The diagram of FIG. 6 also shows a first user 605a and a second user 605b, each user 605 associated with a respective first client device 607a and second client device 607b. That is, each user 605 may have an account which they log in to on a client device to access relevant Wi-Fi sensed data 609 through the user interfaces described herein. In the example of FIG. 6, the first user device 607a is a smartphone device and the second user device 607b is a tablet device. It will be appreciated, however, that other computing devices may be used. Each user device 607a,b is in communication with the server 603 to facilitate implementation of the user interfaces described herein.

The Wi-Fi sensing systems located at each of Places 1, 2 and 3 (601a, 601b and 601c respectively) may transmit Wi-Fi sensed data 609 to the server 603. The server 603 may include a server memory component 615 that holds data structures 613 comprising, for example, user data, location data and relevant permissions for each user. Descriptions of exemplary data structures that may be stored in the server memory 615 are provided with respect to FIGS. 7 and 8. It will be appreciated, however, that in some embodiments the data structures 613 may be stored in a device memory component 1110, as described with reference to FIG. 11.

Wi-Fi sensing data 609 for each place, used to generate the user interfaces described herein, may be communicated to one or more client device 607 based on the user permissions held in the data structures 613. For example, the user permissions held in the data structures 613 may identify that the first user 605a has access to Places 1, 2 and 3 (601a, 601b and 601c respectively). That is, for the first user 605a, Places 1, 2 and 3 may be considered the "relevant" places for which visual representations of Wi-Fi sensed data are rendered on the user interfaces of FIGS. 1-3. As a result, the user interfaces generated on the first client device 607a may provide Wi-Fi sensed data 609 pertaining to all of Places 1, 2 and 3 (601a, 601b and 601c respectively), as represented by table T1. In this example, the first user 605a may be a curator or moderator, as described previously herein. In another example, the user permissions held in the data structures 613 may identify that the second user 605b has access only to Place 3 601c. As a result, the user interfaces generated on the second client device 607b may provide Wi-Fi sensed data 609 pertaining only to Place 3 601c, as represented by table T2.

In the example of FIG. 1, the place at which each user was last seen is identified through the user interface; this feature may be implemented as shown in the exemplary network of FIG. 6. Each client device 607 may provide GPS data 611 to the server 603. Location data stored in the data structures 613 at the server 603 may include coordinate data pertaining to each place 601. The server may use the GPS data 611 provided by each client device 607 to identify when each user arrives at or leaves a particular place 601. For example, when the server 603 identifies, based on Wi-Fi sensed data provided by a particular client device 607, that the corresponding user 605 has arrived at a particular place, the server 603 may provide the GPS data to the Wi-Fi sensed system of the particular place. The Wi-Fi sensing system may therefore associate presence, motion or other activity within the particular place with the particular user 605.

In some embodiments, processing operations which are performed on the Wi-Fi sensed data 609 to enable generation of the relevant user interfaces may be performed at the server 603, the server 603 providing the processed Wi-Fi sensed data 609 to the relevant client devices 607 based on the permissions stored in the data structures 613. In other embodiments, the same processing operations may be performed on the Wi-Fi sensed data 609 by the Wi-Fi sensing system of a particular place 601. In such an embodiment, processed Wi-Fi sensing data may arrive at the server 603, the server 603 distributing the Wi-Fi sensing data 609 according to the user permissions stored in the data structures.

It will be appreciated that FIG. 6 shows an exemplary overall environment or network. In some embodiments, the network may include more or fewer users and or places.

The following describes several exemplary data structures, such as those described with reference to FIG. 6. FIG. 7 shows an exemplary user data structure 701 which comprises data pertaining to each user in a cluster. The user data structure 701 comprises a plurality of user IDs 703, each user ID 703 corresponding to a user name 705, a user type 707 and a hobby icon identifier 709. Each user ID 703 may be a unique string assigned to a particular user account and used to provide the correct Wi-Fi sensed data and user interface features to each user. Each user name 705 may be a name or nickname associated with a particular identifier ID which is provided by the user upon creation of their account, and which is unique to that user. A user may be able to change their name 705, for example in a settings section of an app. The user data structure 701 may be updated each time a name 705 changes. The user data structure also includes a user type indicator 707. The user type indicator may determine a level of administrative authority within the cluster of users. For example, the user "Peter" has a user type indicator 707 set at a value of "1". This may indicate that Peter is a curator for the cluster of users. The users "Claire" and "Julie" are associated with a user type indicator 707 value of "2", which may indicate that Claire and Julie are normal users. It will be appreciated that though not shown in the exemplary data user structure 701 of FIG. 8, more user type indicators may exist. For example, a user type indicator 707 value of "3" may indicate that the corresponding user is a steward user, as described earlier herein. Each user in the user data structure 701 is further associated with a hobby icon identifier 709, the hobby icon identifier determining which hobby icon to show on a user interface to represent the associated user. As described with respect to FIG. 1, each user may select a hobby icon from a plurality of available hobby icons stored in memory. When a particular hobby icon is selected and assigned to a particular user, the hobby icon indicator 709 within the user data structure 701 is updated to correctly associate each user with their selected hobby icon.

Figure 8:
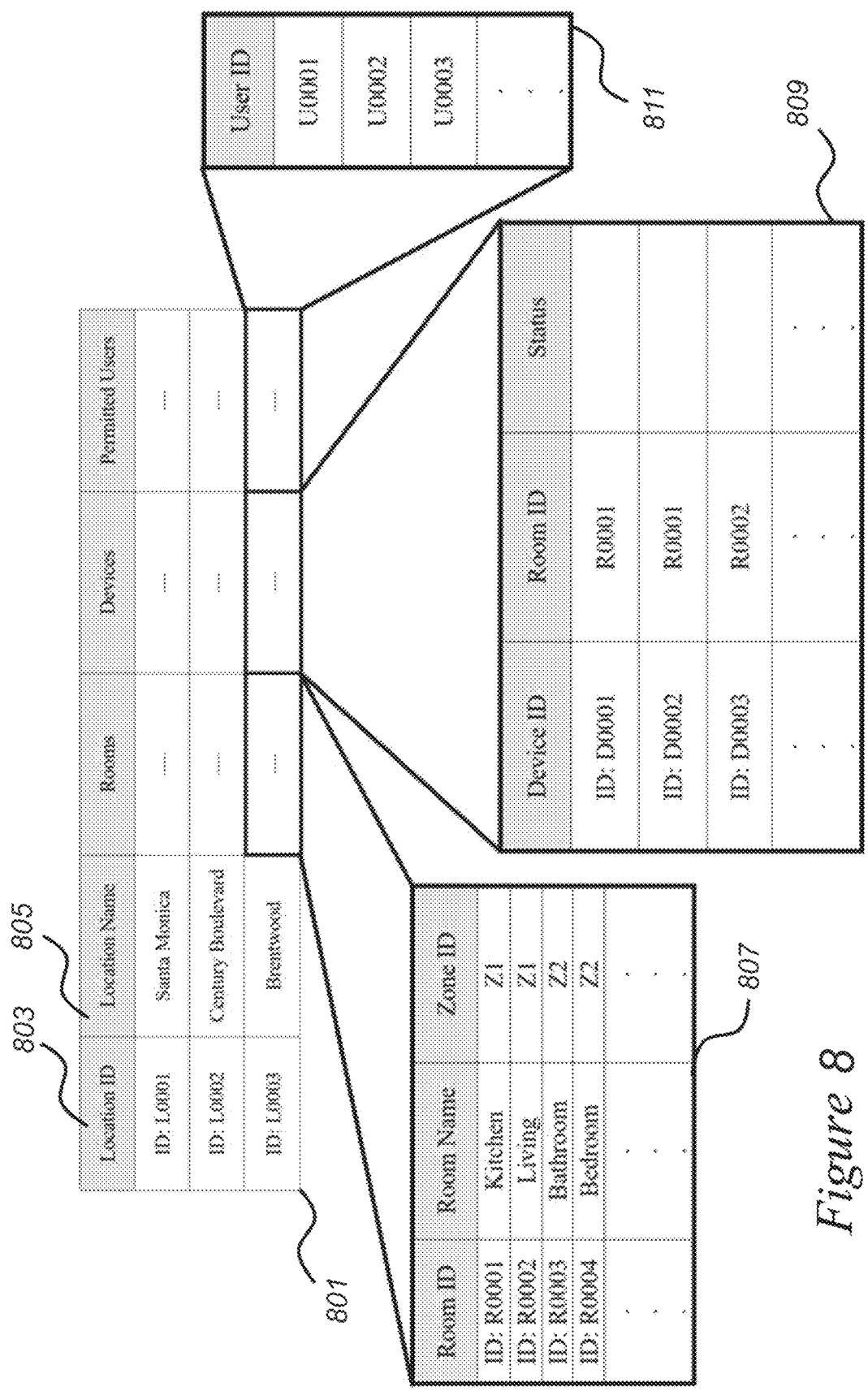
FIG. 8 shows an exemplary data structure comprising data for a plurality of locations.

FIG. 8 shows several exemplary interconnected data structures 801, 807, 809 and 811 to generate user interfaces and provide the user interfaces to the correct users. The exemplary data structures shown FIG. 8, which comprise location data, may be used in conjunction with a data structure comprising user data, such as that of FIG. 7, to generate and provide the user interface features described herein.

FIG. 8 shows a location data structure 801 comprising data pertaining to a plurality of real-world places, each real-world place having a Wi-Fi sensing system installed therein. The location data structure 801 comprises a plurality of location identifiers (IDs) 803. Each location identifier 803 may be associated with a location name 805, which may be provided by a user upon creation or editing of the corresponding location. Each location ID 803 may be associated with one or more data sub-structures, each data sub-structure comprising further information pertaining to its associated location. For example, each location ID 803 may be associated with a room sub-structure 807.

A room sub-structure 807 may comprise a row per room in the corresponding location, each row including a room ID, a room name and a zone ID. Note that the room sub-structure 807 may be updated to include a new row if a new room is added to the location, for example by a curator user. In the example of FIG. 8, the room sub-structure 807 corresponding to the location "Brentwood" is shown. Referring to FIG. 2, wherein a user interface 202 corresponding to the Brentwood location is shown, each room card 210 in the user interface 202 is generated based on the rows in the room sub-structure 807 of FIG. 8. For example, the sub-structure 807 comprises a room with room ID: "R0001", named "Kitchen", which is identified as having zone ID: "Z1"; the user interface 202 of FIG. 2 includes a room card 210 which represents this row in the sub-structure 807. In this example, the zone ID "Z1" corresponds to the "Ground Floor" zone of the Brentwood location, as shown in FIG. 2. Though not shown in the example of FIG. 8, the name associated with each zone may also be included in the room sub-structure 807.

Note that the room sub-structure 807 may also include, for each room, data pertaining to an assigned sound level and a corresponding sound level indicator 214 to be rendered on a location-specific interface 202.

Each location ID 803 in the location data structure 801 may further be associated with a device sub-structure 809, the device sub-structure comprising a row per device that is installed in the corresponding location. Each row may include a device ID for the associated device and a room ID corresponding to the room in which the device is located. With reference to FIG. 2, note that the device panels 216 for each room card 210 may be generated based on the room ID associated with each device in the device sub-structure 809. It will be appreciated that though not shown in FIG. 8, the device sub-structure may also comprise data which determines an icon used to represent the device in each device panel 216 of FIG. 2. The device sub-structure 809 may further include data which determines an alarm status for each device, and a corresponding device-specific alarm indicator 218.

Each location ID 803 in the location data structure 801 may further be associated with a permitted user's sub-structure 811, which comprises a column of user IDs corresponding to users who are permitted to view the Wi-Fi sensing data for the corresponding location. Note that in the example of FIG. 8, users with user IDs U0001, U0002 and U0003 are found in the permitted user's sub-structure 811. Referring back to FIG. 7, the above implies that the users: Peter, Claire and Julie are permitted to monitor Wi-Fi sensing data pertaining to the Brentwood location.

In some embodiments, the location data structure 801 may further include geographical data such as coordinates for each location ID 803, which may be used to identify instances when a user enters or leaves a particular place, as described with respect to FIG. 6. The location data structure 801 may also include, for each location, data pertaining to a mode and corresponding mode icon 108.

Figure 9:
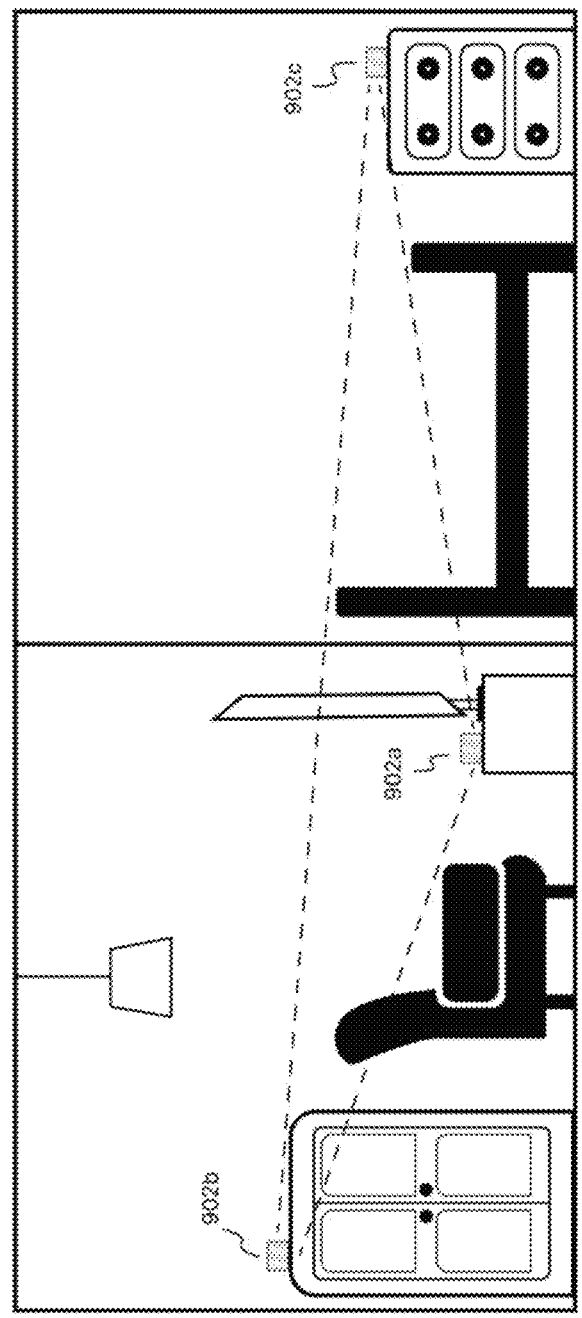
FIG. 9 shows an exemplary Wi-Fi sensing mesh network in a home.

FIG. 9 shows a house with three rooms, each room housing at least one network device 902*a*—d. The house of FIG. 9 is an example "place" or "location" of the present disclosure, where a place is a region being monitored by the sensing network. There are two network devices 902*a*, 902*b* in the living room, and one device 902*c* in the bedroom.

The network shown in FIG. 9 has a full network topology, where each device 902*a*—d is in direct communication with each of the other devices 902*a*—d. Additionally, each of the devices 902*a*-*d* acts as both a transmitter and a receiver, as shown by the bi-directional arrows.

That is, for example, the device 902*c* in the bedroom receives signals from the two devices 902*a*, 902*b* in the living room. It also transmits signals to each of the devices 902*a*, 902*b*. By placing network devices around the house, a sensing network can be configured which transmits signals between devices 902*a*—c such that the signals can be used to sense most—if not all—of the house. Existing Wi-Fi sensing systems comprise devices which are dedicated beacons or receivers, limited to only one functionality. A novel Wi-Fi sensing system which uses dual-purpose beacon and receiver devices in a mesh network configuration is described in more detail in our sister application: [PWF REF: 429513SG SG Application No 10202109485W], the contents of which are incorporated by reference. The present security system may be implemented with any suitable Wi-Fi sensing system.

Although the signals in FIG. 9 are shown to be transmitted in a straight line between the transmitter and the receiver, at least part of each signal may be reflected off surfaces, including furniture and walls.

Figure 10:
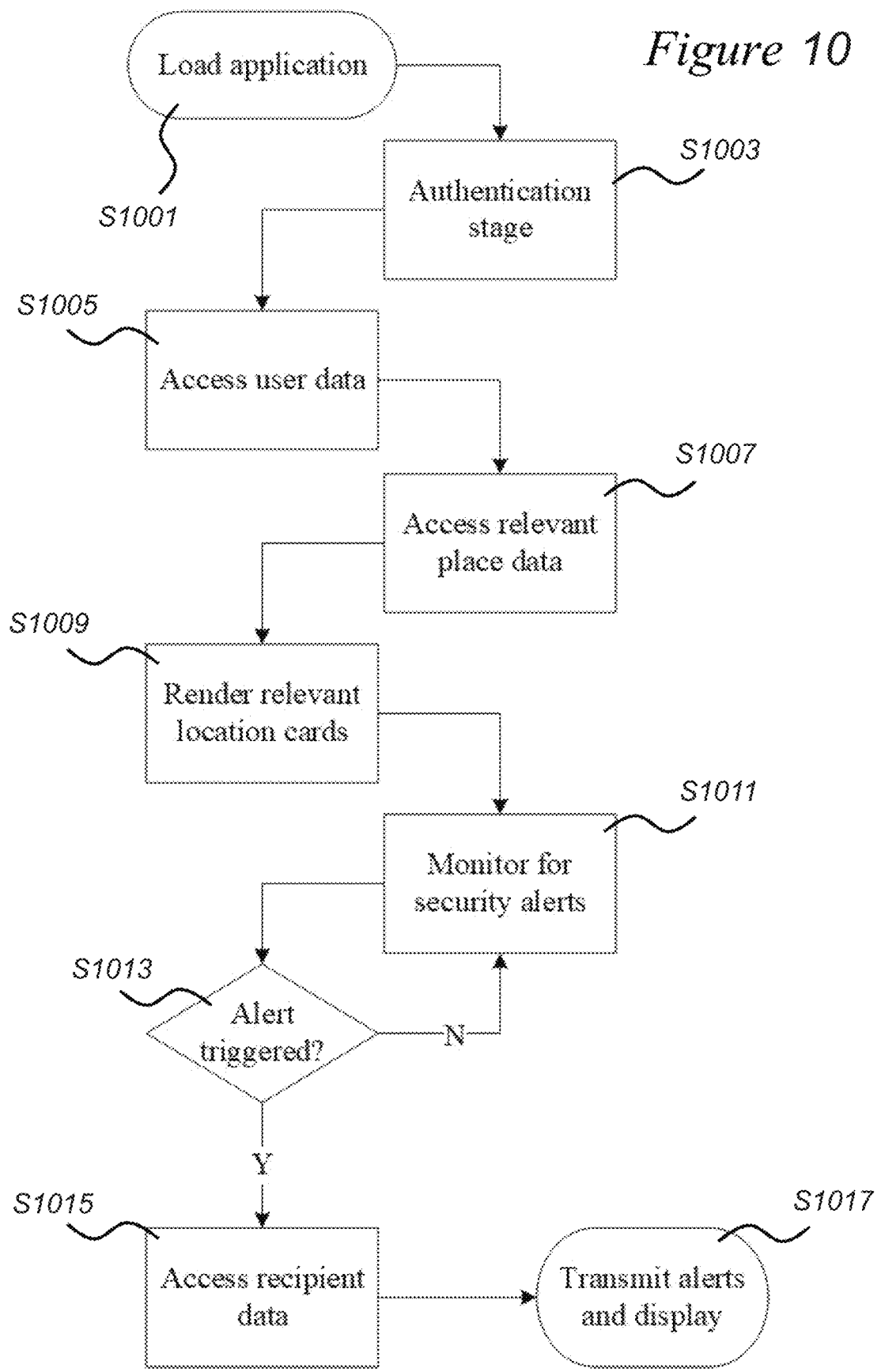
FIG. 10 shows a flowchart which demonstrates the authentication, login and security monitoring features of the user interfaces described herein.

FIG. 10 shows a flow chart which demonstrates an embodiment of the authentication, login and security monitoring features of the user interfaces described herein. In the example of FIG. 10, the user interface is loaded in an application running on a client device 607*a*, 607*b*. Further, it should be noted that the exemplary operating user described in FIG. 10 may form a cluster of other users, with whom the operating user is linked.

FIG. 10 begins at a step S1001, wherein the application is loaded on the client device 607*a*, 607*b*. The user may be presented with a user interface configured to receive login details such as a username and password. At a step S1003, the application receives user input of login details.

Figure 11:
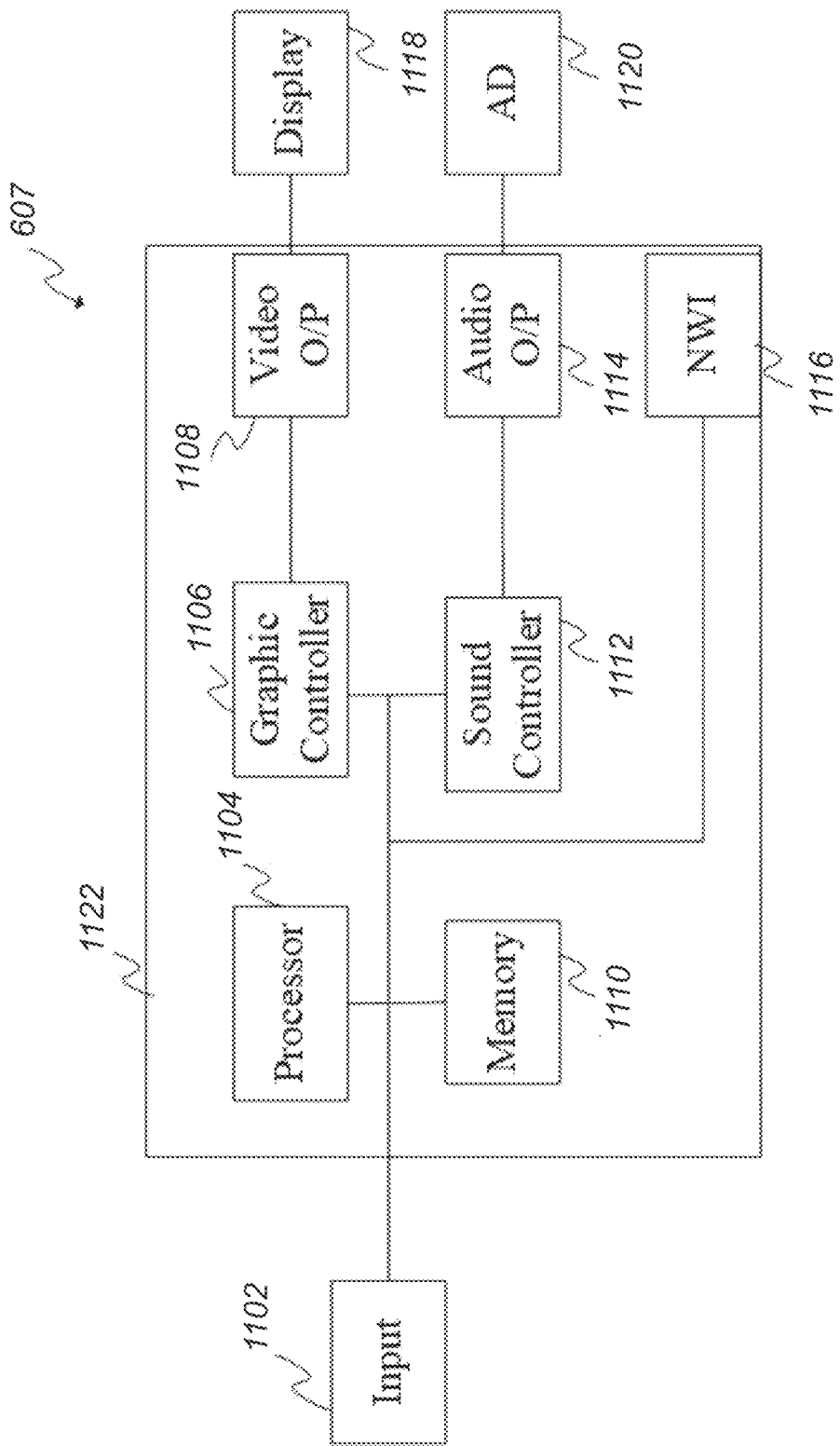
FIG. 11 is a schematic diagram of a client device on which the user interface features described herein may be implemented.

At a step S1005, upon entry of valid login details, the client device 607*a*, 607*b* may access user data from memory. For example, the client device may access a data structure comprising user data, such as the exemplary user data structure 701 shown in FIG. 7, which may be stored in a server memory component 615 and accessible via a network such as the internet. In other embodiments, the user data structure 701 may be stored in a client device memory 1110, as illustrated in FIG. 11.

At a step S1007, the client device 607 may access data pertaining to places that are relevant to the user. For example, the client device 607 may access a data structure comprising place data and user permissions for each place, such as the exemplary location data structure 801 shown in FIG. 8, to identify which locations are relevant to the user, and therefore to identify the places for which Wi-Fi sensing data is to be retrieved. Again, the location data structure 801 may be stored in a server memory component 615 and accessible via a network such as the internet or may be stored internally on the client device 607 in the client device memory 1110.

At a step S1009, based on the user data and place data retrieved from the respective data structures, the client device 607 renders a plurality of location cards 104 on a display 1118, each location card 104 corresponding to a place comprising a Wi-Fi sensing system, and for which the user has permission to view visual representations of Wi-Fi sensed data.

At a step S1011, the application may receive real-time updates of Wi-Fi sensing data for each of the places relevant to the user, monitoring trends and patterns in the data to identify potential security alerts. It will be appreciated that though FIG. 10 is in context of security alerts, other alerts such as wellness monitoring alerts may be implemented in other embodiments.

At a step S1013, the application determines whether or not the Wi-Fi sensed data for one or more place exhibits a pattern or other sign that a security alert should be triggered. If no alert is deemed to be triggered, the flow returns to step S1011, where the Wi-Fi sensed data is monitored further. If, at step S1013, an alert is triggered for a particular place, the flow continues to a step S1015, wherein the place data structure is accessed to determine one or more users to whom the alert should be sent. It will be appreciated that in some embodiments, all users to whom a particular place is relevant may receive alerts that are triggered in that particular place. In other embodiments, however, some but not all users to whom the place is relevant may be identified as a recipient of an alert for that place.

The flow ends at a step S1017 wherein, if the operating user of FIG. 10 is identified as a recipient user for the alert at step S1015, a notification of the security alert may be transmitted to the device of the operating user. Note also that the same alert may be transmitted to the devices of one or more other identified recipient user. The alert notification is then rendered on the user interface on each recipient user's client device.

Note that alert notifications may not be sent only through the application. For example, the user data structure may comprise contact details such as an email address, mobile or other phone number etc., which may be accessed each time an alert is triggered. If an alert is triggered in a particular place, each user identified as an alert recipient for that particular place may be contacted using one or more of the contact details stored in the user data structure.

In certain embodiments, locations may be intelligent, self-managed and autonomous. Locations may act based on the sensing data to enhance the comfort of their user. Multiple automation scenarios are possible with the variety of data that a monitoring system can provide. For example, locations will be able to decrease or increase the security level based on both occupancy and geofencing information.

A schematic view of the client device 607 according to an embodiment is shown in FIG. 11. The user device 607 has a controller 1122. The controller 1122 may have one or more processors 1104 and one or more memories 1110. For example, a computer code of executing the mesh configuration algorithm and/or the sensing mode engines on the user device 607 may be stored in the memory 1110. The configuration memory may also be stored at the memory 1110. The memory 1110 may also store the application which provides the user with capabilities for selecting devices and receiving visual representations of sensed data, sensing information and alerts, the application being implemented by the processor 1104.

The controller 1122 is also shown as having a graphics controller 1106 and a sound controller 1112. It should be appreciated that one or both graphics controller 1106 and sound controller 1112 may be provided by the one or more processors 1104. Other functional blocks may also be implemented by suitable circuitry or computer code executed by the one or more processor 1104.

The graphics controller 1106 is configured to provide a video output 1108. The sound controller 1112 is configured to provide an audio output 1114. The controller 1122 has a network interface 1116 allowing the device to be able to communicate with a network such as the Internet or other communication infrastructure.

The video output 1108 may be provided to a display 1118. The audio output 1114 may be provided to an audio device 1120 such as a speaker and/or earphones(s).

The device 607 may have an input device 1102. The input device 1102 can take any suitable format such as one or more of a keyboard, mouse, or touch screen. It should be appreciated that the display 1118 may in some embodiments also provide the input device 1102, for example, by way of an integrated touch screen.

The blocks of the controller 1122 are configured to communicate with each other via an interconnect such as a bus or any other suitable interconnect and/or by point-to-point communication.

It should be appreciated that, in some embodiments, the controller 1122 may be implemented by one or more circuits, at least in part.

It should be appreciated that embodiments may be deployed in different system architectures. For example, the sensing engines may be implemented as a computer program that is stored in the memory 1110 of the user device 607. In another system architecture, the configuration memory and/or the sensing mode engines are stored at the server 603, and implemented by a processor of the server 603. Sensing information is then provided by a network to the user device 607 for providing to the user via the user interface.

It will be appreciated that the above embodiments have been described only by way of example. Other variations and applications of the present invention will be apparent to the person skilled in the art in view of the teaching presented herein. The present invention is not limited by the described embodiments, but only by the accompanying claims.

What is claimed is:

1. A monitoring system for monitoring a plurality of places at separate geographical locations, each place having a Wi-Fi sensing system installed at the place, the monitoring system comprising:
    a computer device having a user interface configured to receive an identifier of a monitoring user, wherein the computer device comprises a network interface configured to receive sensed data from each of the plurality of places, wherein the network interface is configured to receive geolocation data of one or more person at each of one or more of the plurality of places;
    a processor configured to process multiple streams of sensed data, each stream of sensed data comprising sensed data from a Wi-Fi sensing system installed, respectively, at each of the plurality of places and indicative of one or more sensed event in the respective place, to generate display data for display at the user interface of the computer device, wherein the displayed data comprises a respective visual representation of a set of data for each of the plurality of places,
    the processor configured to simultaneously render at the user interface at least two of the sets of data associated respectively with at least two of the plurality of places associated with the monitoring user; and
    computer memory that stores for each person of a plurality of people a set of one or more places associated with that person, whereby each person is authenticated as a monitoring user of each of the places associated with that person.

2. The monitoring system of claim 1, wherein the sensed event is indicative of motion and/or presence of a living being in the respective place.

3. The monitoring system of claim 2, wherein the living being is a person or animal.

4. The monitoring system of claim 1, wherein the processor is configured to store the received geolocation data for each person and to record an indication of the most recent place where that person was located, based on the geolocation data.

5. The monitoring system of claim 4, wherein the processor is configured to render on the display a visual indication of the most recent place where one or more person was located in association with a graphical indicator of that person.

6. The monitoring system of claim 5, wherein the visual identifier comprises a graphical icon associated with that person.

7. The monitoring system of claim 1, wherein the user interface is configured to receive an authenticator associated with the monitoring user, and the processor is configured to authenticate the monitoring user based on the authenticator.

8. The monitoring system of claim 1, comprising a computer server which is configured to provide a communication path which is configured to communicate with the computer device, the server being arranged to receive sensed data from each of the plurality of places and to transmit the sensed data to the computer device.

9. The monitoring system of claim 8, wherein the server comprises a computer memory which stores for each person of a plurality of people a set of one or more places associated with that person, whereby each person is authenticated as a monitoring user of each of the places associated with that person.

10. The monitoring system of claim 1, comprising computer storage in which is stored a security contacts list comprising contact identifiers of a group of people with monitoring user access to the plurality of places, whereby each person on the security contacts list is authenticated as a monitoring user for the plurality of places.

11. The monitoring system of claim 1, wherein the processor is configured to render on the display an occupancy status associated with each of the places based on the sensed data.

12. The monitoring system of claim 1, wherein the processor is configured to render on the display an activity status for each of the places based on the sensed data.

13. A method of monitoring a plurality of places at separate geographical locations, each place having a Wi-Fi sensing system installed at the place, the method comprising:
    storing, for each person of a plurality of people, a set of one or more places associated with that person, whereby each person is authenticated as a monitoring user of each of the places associated with that person;
    receiving at a user interface of a computer device an identifier of a monitoring user associated with the plurality of places, each of the plurality of places having an installed Wi-Fi sensing system;

receiving sensed data from each of the plurality of places, wherein the sensed data comprises geolocation data of one or more person at each of one or more of the plurality of places;

authenticating the identifier of the monitoring user;

responsive to authentication of the monitoring user, generating display data for display to the monitoring user, the display data generated from multiple streams of sensed data, each stream comprising sensed data from the Wi-Fi sensing system, respectively, from each of the plurality of places and indicative of a sensed event in the respective place; and simultaneously rendering on a display at least two sets of display data associated with at least two of the plurality of places associated with the monitoring user, where each set of display data is rendered using a visual representation for each of the plurality of places.

14. The method of claim 13, wherein each visual representation is visually distinct for each of the plurality of places.

15. The method of claim 14, comprising receiving a user selection of one of the visual representations and responsive to the user selection of that visual representation displaying one or more of occupancy status and activity status based on the sensed data.

16. The method of claim 14, comprising rendering on the display at least one of an occupancy status and an activity status.

17. A computer program product, comprising a non-transitory computer-readable medium having computer-readable program code embodied therein to be executed by one or more processors, the program code including instructions to:

monitor a plurality of places at separate geographical locations, each of the plurality of places having an installed Wi-Fi sensing system;

store, for each person of a plurality of people, a set of one or more places associated with that person, whereby each person is authenticated as a monitoring user of each of the places associated with that person;

receive at a user interface of a computer device an identifier of a monitoring user associated with the plurality of places;

receiving sensed data from each of the plurality of places, wherein the sensed data comprises geolocation data of one or more person at each of one or more of the plurality of places;

authenticate the identifier of the monitoring user;

generate, in response to authenticating the identifier of the monitoring user, display data for display to the monitoring user, the display data generated from multiple streams of sensed data, each stream comprising sensed data from the Wi-Fi sensing system from each respective place and indicative of a sensed event in the place; and render simultaneously on a display at least two sets of display data associated with at least two of the plurality of places associated with the monitoring user, wherein each set of display data is rendered using a visual representation for each of the plurality of places.

* * * * *